United States Patent

[11] 3,611,331

[72] Inventor Peter I. Bonyhard
Newark, N.J.
[21] Appl. No. 882,137
[22] Filed Dec. 4, 1969
[45] Patented Oct. 5, 1971
[73] Assignee Bell Telephone Laboratories Incorporated
Murray Hill, N.J.

[54] SINGLE WALL DOMAIN SOURCE
5 Claims, 9 Drawing Figs.

[52] U.S. Cl. 340/174 TF, 340/174 SR, 340/174 HP
[51] Int. Cl. G11c 11/14, G11c 19/00
[50] Field of Search 340/174 SR, 174 TF

[56] References Cited

UNITED STATES PATENTS 3,555,527 1/1971 Perneski 340/174

*Primary Examiner*—James W. Moffitt
*Attorneys*—R. J. Guenther and Kenneth B. Hamlin

ABSTRACT: An improved source of single wall domains is described where a magnetically soft overlay pattern is structured to stretch a domain in response to a reorienting field in the plane of the material in which single wall domains are moved.

INVENTOR
P. I. BONYHARD
BY Herbert M Shapiro
ATTORNEY

SINGLE WALL DOMAIN SOURCE

FIELD OF THE INVENTION

This invention relates to information processing apparatus and, more particularly, to such apparatus employing sheets of magnetic material in which single wall domains can be moved.

BACKGROUND OF THE INVENTION

A single wall domain is a magnetic domain encompassed by a single domain wall which closes upon itself and defines a boundary between the domain so encompassed and the surrounding regions of opposite polarity. The boundary of a single wall domain is independent of the boundary of the sheet in the plane in which it is moved. Consequently, movement of the domain in the two-dimensional space defined by the sheet is permitted. The Bell System Technical Journal, Volume XLVI, No. 8, Oct. 1967, pages 1,901 et seq., describes shift register operation employing single wall domains in sheets of rare earth orthoferrites.

A variety of propagation techniques for moving single wall domains have been developed. A typical magnetic sheet in which single wall domains can be moved is characterized by a preferred direction of magnetization out of the plane of the sheet. Let us adopt the convention that the magnetization of a single wall domain is in a positive direction along an axis assumed normal to the sheet while the magnetization of the remainder of the sheet is in a negative direction along that axis. In this context, a single wall domain may be represented as a circle which corresponds to the single domain wall thereabout. A discrete conductor in the form of a circular loop on the surface of the sheet generates a field which is positive or negative along the axis of magnetization dependent on the polarity of current in the loop. Such a loop in a position offset from a domain generates an attracting (positive) field when pulsed. The domain "sees" that field (actually field gradient) and moves to a least energy position in response. By pulsing consecutively offset loops, the domain can be moved to any position in the sheet.

The propagation loops permit logic operation to be carried out between neighboring domains by taking advantage of the repulsion forces between selected ones of those domains. But the loop geometry of the conductors occupies a greater space than would be required if the constraint of discrete propagation conductors could be obviated.

Copending application Ser. No. 732,705, filed May 28, 1968 and now U.S. Pat. No. 3,534,347 for A. H. Bobeck, among others, describes implementations for achieving propagation of single wall domains without discrete propagation conductors. An overlay of a soft magnetic material such as permalloy defines a propagation channel for domains in a suitable magnetic sheet. The overlay is patterned conveniently in the form of consecutive bar and T-shaped elements which support a moving and repetitive magnetic pole configuration which attracts the domains. A magnetic field rotating in the plane of the sheet causes the pole pattern to change in a manner to move domains from input to output positions. Although such an arrangement is simpler to fabricate than an arrangement requiring discrete propagation conductors and permits increased packing densities as well, it is not easily adapted for performing all the logic functions achievable with the discrete conductors.

A variety of compromises have been worked out to gain the advantages of both approaches. For example, a single conductor for each propagation channel along with a permalloy overlay of prescribed geometry permits certain logic operations but still does not require discrete propagation conductors.

Regardless of the mode of propagation and the associated logic capabilities, it is important that domains be introduced controllably into the magnetic sheet for propagation. But a typical sheet of magnetic material suitable for the propagation of single wall domains and saturated magnetically in a negative direction requires thousands of oersteds to nucleate a single wall domain. Movement of a domain, on the other hand, requires only a few oersteds.

To avoid excessive power demands, techniques have been devised to sever a domain from a source of domains at power levels comparable to those required for domain propagation; that is about the few oersted level. Copending application Ser. No. 579,931, and now U.S. Pat. No. 3,460,116 filed Sept. 16, 1966 for A. H. Bobeck, U. F. Gianola, R. C. Sherwood, and W. Shockley describes one such input arrangement where an area of positive magnetization is defined by a current in a conductor outlining the area. A hairpin-shaped input conductor, overlying the area, may be used to generate a field for severing a portion of the area in response to an input pulse of appropriate polarity.

An object of this invention is to provide a new and improved input arrangement for generating single wall domains at relatively low fields and in the absence of area outlining conductors.

BRIEF DESCRIPTION OF THE INVENTION

Copending application Ser. No. 756,210 filed Aug. 29, 1968 and now U.S. Pat. No. 3,555,527 of A. J. Perneski discloses that a single wall domain can be stretched and then separated into two, in response to a rotating in-plane field, by the controlled movement of magnetic poles in opposite directions along a properly designed overlay. In accordance with the present invention, an additional field is provided to expedite that separation into two domains. In one embodiment, an electrical conductor is positioned to generate the requisite additional field in a position across which a domain is stretched prior to separation. A short pulse on the conductor permits domain separation with relatively high margins.

DETAILED DESCRIPTION

Figure 1:
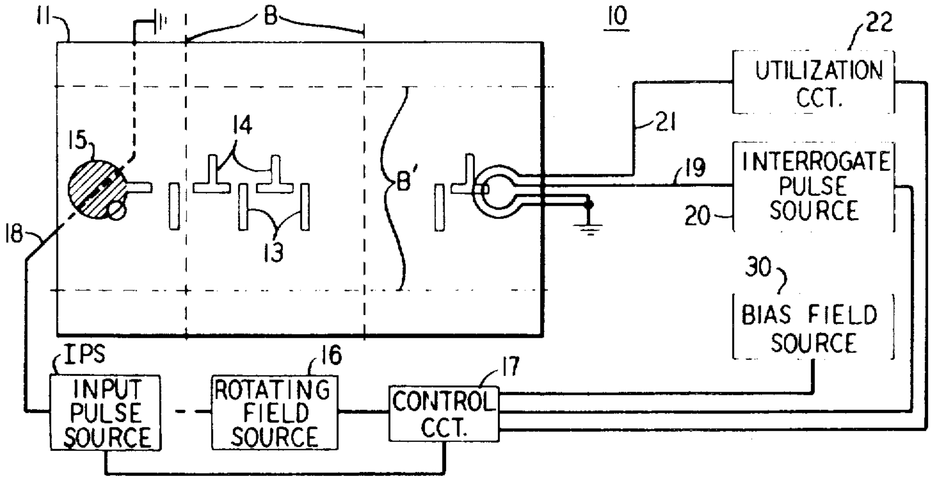
FIG. 1 is a schematic representation of a single wall domain propagating arrangement including an input in accordance with this invention.

FIG. 1 shows a domain propagation arrangement 10 including a sheet 11 in which single wall domains can be propagated.

A channel for domain propagation is defined by bar and T-shaped overlay elements 13 and 14, and includes a disc or overlay element 15, aligned between input and output positions. Domains move by following the attracting pole concentrations generated in the overlay elements in response to a rotating in-plane magnetic field. The source of the rotating field is represented by block 16 so designated and may comprise two orthogonal sets of coils positioned along broken lines B and B' to which properly phased sine waves or pulses are applied under the control of control circuit 17.

The input position for domains in the propagation channel is defined to the left as viewed in FIG. 1 and includes permalloy disc 15. Disc 15 is shown as round but may be of other geometry, conveniently square. A domain D is provided in a manner such that it is permanently associated with disc 15, moving about the periphery thereof in response to the rotating in-plane field. A demagnetized sheet, to which a (bias) field of a polarity to contract domains is applied, exhibits a number of domains for this purpose.

An electrical conductor 18 is positioned with respect to disc 15 as shown in FIG. 1. Conductor 18 is connected between an input pulse source IPS and ground. Conductor 18 is pulsed when domain D is stretched in response to an in-plane field to, inter alia, assist the splitting of the stretched domain into two. The sequence of steps whereby domain D is split and the consecutive field orientations for achieving those steps are depicted in FIGS. 2–8.

Figure 2:
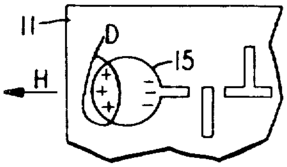
FIGS. 2, 3, 4, 5, 6, 7, and 8 are fragmentary schematic representations of the input arrangement of FIG. 1 showing magnetic conditions thereof during operation and the orientations of an in-plane field for producing these conditions.

FIGS. 2 through 8 show the magnetic conditions of the input as the in-plane field H rotates through consecutive orientations. FIG. 2 shows the condition when a field H is in an arbitrary initial orientation to the left as represented by the arrow so designated in FIG. 2. Positive poles accumulate at the left of disc 15; negative poles at the right. For a disc on the top surface of sheet 11 as viewed in FIG. 1, positive poles attract a domain in accordance with the assumed convention. When the disc is on the bottom of sheet 11, negative poles attract a domain. The same is true of the bar and T-shaped elements which may or may not be on the same side of sheet 11 as the disc. A domain D is seen to correspond to the position of the positive poles.

Figure 3:
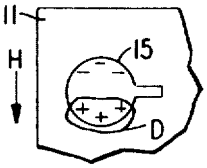

In FIG. 3, the in-plane field is shown directed downward. The resulting pole concentration is as represented by the plus and minus signs. The domain moves to the bottom of disc 15 as viewed.

Figure 4:
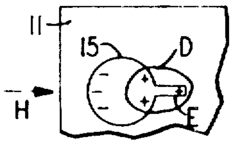

FIG. 4 shows the field directed to the right. The strongest positive pole is now at the right extreme of the extension E of disc 15. Yet other positive poles are at the right edge of the disc. The domain assumes the position and shape shown.

Figure 5:
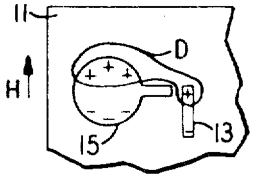
Figure 6:
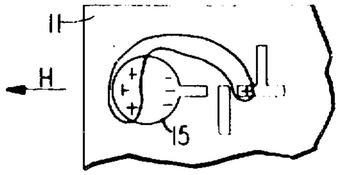
Figure 7:
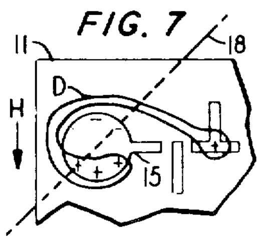

In FIG. 5 the in-plane field is directed upward. When the field is in this orientation, each of the nearest bar 13 and the disc has a strong pole distribution attracting domain D. The domain stretches as a result, assuming bias field levels sufficiently low to permit such stretching. This stretching continues as the field rotates still further counterclockwise as shown in FIGS. 6 and 7. The specific contour of the domain in each figure is due to the repelling effect of negative poles on disc 15.

FIG. 7 depicts the domain configuration just as the domain is about to divide into two. Conductor 18 is pulsed at this juncture. A 200 nanosecond pulse is typically all that is required to effect division of the domain regardless of the in-plane field magnitude and overlay thickness. The operating margins are determined by domain collapse and runout, the bias values at which a domain collapses and runs out into a strip respectively. Drive field requirements are reduced typically by more than fifty per cent from, for example, 20 oersteds in the absence of conductor 12 to less than 5 oersteds.

Figure 8:
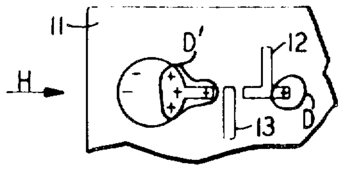

FIG. 8 shows the initial domain at an advance position on a T-shaped overlay 12 whereas a domain D′ is in the position shown for domain D in FIG. 4. Of course, the representations of the domains are arbitrary; the mechanism for domain division is not fully understood. It is clearly observed, however, that a domain does stay associated with disc 15 and a domain is generated therefrom in response to a rotating in-plane field when conductor 18 is pulsed. In the absence of such a pulse, no domain separation occurs as is explained more fully below.

We have now discussed the selective introduction of a single wall domain for synchronous movement along a propagation channel. It is clear also that the presence and absence of a domain at a particular position indicates a binary one and a binary zero respectively. An information representative pattern of domains so generated is moved to an output position in a manner clear from FIG. 8 following the attracting pole patterns along the propagation channel.

An output position is shown in FIG. 1 defined by a conductor loop 19 encompassing a terminal position in the channel. Conductor 19 is connected between an interrogate pulse source 20 and ground. A conductor 21 also encompasses the same terminal position, being connected between a utilization circuit 22 and ground. Each time a rotation of the in-plane field produces the magnetic condition of FIG. 8, source 20 pulses conductor 19 to generate a field to collapse a domain in the terminal position. If a domain is occupying the terminal position when the collapse field is applied, a pulse is generated in conductor 21 for detection by circuit 22. Source 20 and circuit 22 are connected to control circuit 17 for synchronization and energization.

The various sources and circuits herein may be any such circuits capable of operating in accordance with this invention.

The arrangement of FIG. 1, in practice, frequently utilized a bias field supplied conveniently by a permanent magnet indicated by block 30 of FIG. 1. Alternatively, a coil is used to provide a bias field antiparallel to the magnetization of a domain when a current *IB* is applied.

Figure 9:
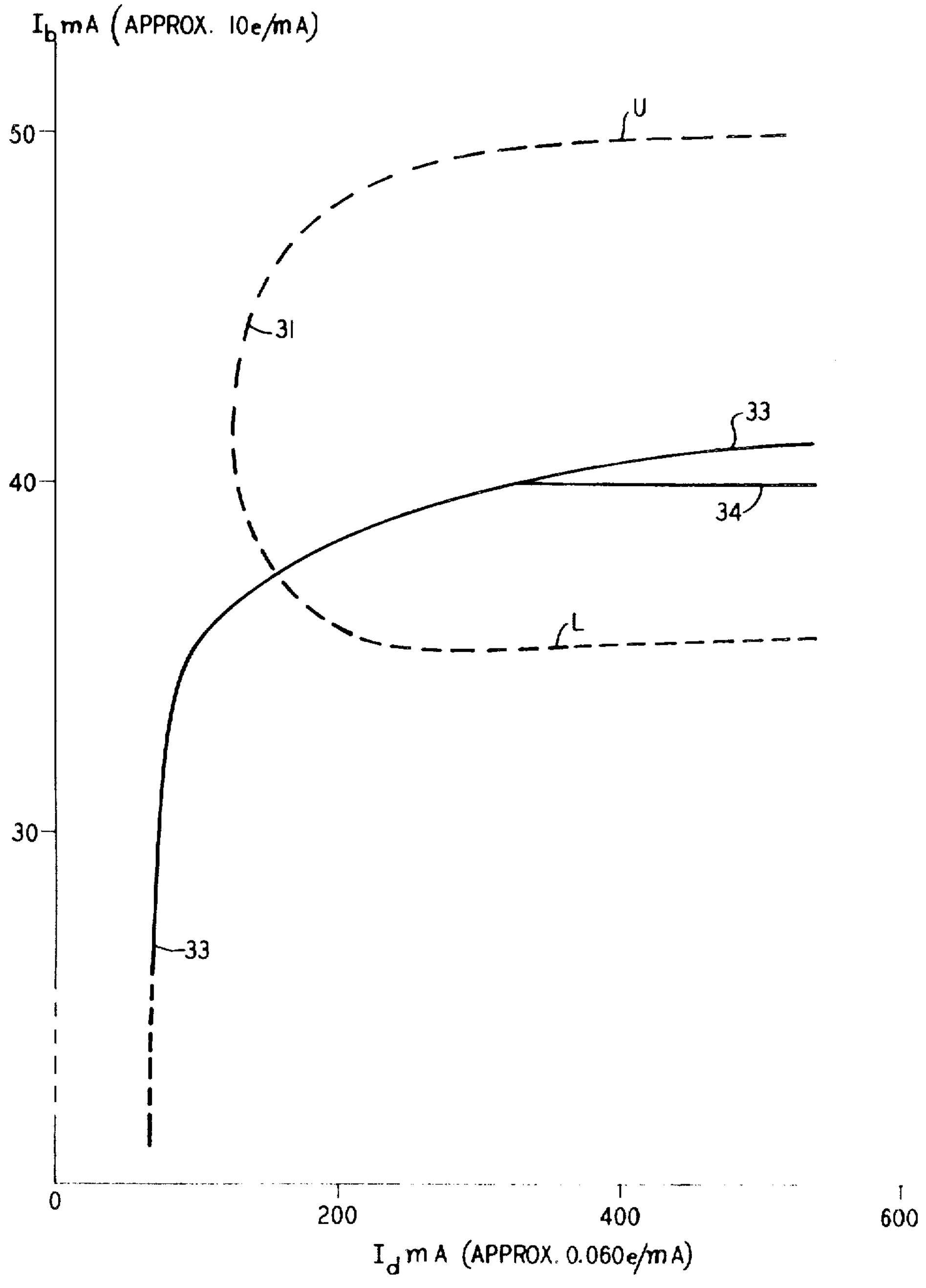
FIG. 9 is a graph representing the margins of the input arrangement of FIG. 1.

FIG. 9 is a plot of bias field H (actually *Ib*) versus the drive (in-plane) field H*d* (actually I*d*). Curve 31 of FIG. 9 demarcates the area in which domains are stable during propagation in response to rotating in-plane fields. Above the upper portion U of curve 31, the bias field is too high for domains to remain stable. Consequently, domains collapse. Below the lower portion L of curve 31, domains run out into strips. The area between the upper and lower portions of curve 31—the area within curve 31—represents the margins realized in accordance with this invention. To the left of curve 31 the drive fields are too low to cause domain propagation.

To be specific, the illustrative operation describes domain stretching prior to separation. FIG. 9 shows a curve 33. For bias values below curve 33, this stretching occurs. Separation of stretched domains occurs in the absence of a pulse on conductor 18 of FIG. 1 only for field values within the area defined by curves 33 and 34. For values corresponding to the area below both curves 33 and 34, domains remain in a stretched condition to be separated into two only when a pulse is applied to conductor 18. For values above curve 33, no normal stretching of the domain occurs as the in-plane field reorients. Rather, the pulse applied to conductor 18 runs the domain out into a strip and separates the so stretched domain instantaneously into two.

It is clear then that although the margins in accordance with this invention are equal to those of domain stability and propagation—namely from values at which domains collapse to those at which domains run out into strips—the margins can be thought of as divided into three areas. The first of these—the area between upper portion U and curve 33 in FIG. 9—is where domains are stretched and separated into two by the pulse on conductor 18 alone. The second—the area between curves 33 and 34—is where separation occurs without a pulse on conductor 18. The third is the area between the lower portion of curve 31 and curve 34 and curve 33. Anywhere in the third area, stretching occurs in response to the rotating in-plane field; but separation occurs only when a pulse is applied to conductor 18.

The improved margins due to operation in accordance with this invention can be appreciated from a comparison of the area between curve 34 and curve 33 representing the margins for domain stretching and separation in the absence of pulsed wire 18, and the area between the upper and lower portions of curve 31 representing the margins realized in accordance with this invention.

It is noted that conductor 18 does not double back on itself (to intersect the disc 15) in a manner to generate a collapse field between two closely spaced branches thereof for separating a stretched domain into two. Such a loop geometry for conductor 18, of course, is compatible with this invention.

It is convenient to place the conductor 18 on the opposite surface of slice 11 of FIG. 1 from that on which disc 15 is disposed.

The introduction of a domain into a selected one of a number of channels also can be achieved in accordance with this invention by selective pulsing of an associated number of conductors 18.

In one specific embodiment, a 2-mil thick slice of samarium terbium orthoferrite included, on its surface, a permalloy square 15, 1,400 A. thick and 10 mils on a side. The overlay pattern had a repeat of 8 mils for moving about a 3-mil diameter domain. The bias field was about 40 oersteds and the in-plane field was about 15 oersteds. Propagation domains were separated from domain D of FIG. 1 with an 800 milliampere 200 microsecond pulse on conductor 18, as described.

What has been described is considered only illustrative of the principles of this invention. Therefore, various other embodiments can be devised by one skilled in the art in accordance with these principles without departing from the spirit and scope of this invention.

What is claimed is:

1. Apparatus comprising a material in which single wall domains can be moved and having first and second surfaces, means for providing changing magnetic pole patterns for stretching a domain simultaneously in different directions in said material responsive to a reorienting in-plane field, an electrical conductor disposed in a manner to intersect a domain so stretched, means for pulsing said conductor when said in-plane field is in an orientation for so stretching said domain, and means for providing said reorienting in-plane field.

2. Apparatus in accordance with claim 1 wherein said means for providing changing magnetic pole patterns includes a magnetically soft disc on said first surface and said electrical conductor is disposed to intersect said disc.

3. Apparatus in accordance with claim 1 wherein said electrical conductor is disposed on said second surface.

4. Apparatus in accordance with claim 2 wherein said means for providing also includes a magnetically soft overlay of bar and T-shaped elements and said in-plane field reorients by rotation.

5. Apparatus in accordance with claim 4 including means for generating a bias field, said bias field of sufficient intensity to permit said stretching in the absence of a pulse in said conductor.